US006760182B2

(12) United States Patent
Bement et al.

(10) Patent No.: US 6,760,182 B2
(45) Date of Patent: Jul. 6, 2004

(54) TEMPERATURE COMPENSATED FLY HEIGHT CONTROL

(75) Inventors: Gary E. Bement, Frederick, CO (US); Mark A. Chapin, Louisville, CO (US); Michael D. Mundt, Longmont, CO (US); Jason W. Riddering, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 281 days.

(21) Appl. No.: 10/079,046

(22) Filed: Feb. 18, 2002

(65) Prior Publication Data

US 2002/0122268 A1 Sep. 5, 2002

Related U.S. Application Data

(60) Provisional application No. 60/273,045, filed on Mar. 2, 2001, and provisional application No. 60/269,924, filed on Feb. 19, 2001.

(51) Int. Cl.$^7$ ............................ G11B 21/02; G11B 5/48
(52) U.S. Cl. .................. 360/75; 360/294.7; 360/244.8; 360/245.4
(58) Field of Search ............................. 360/75, 25, 31, 360/294.7, 244.8, 244.2, 245, 254.3, 254.4, 254.5, 254.8, 255.3, 255.7, 255.4, 255.8, 245.4

(56) References Cited

U.S. PATENT DOCUMENTS

| | | | |
|---|---|---|---|
| 4,551,974 A | 11/1985 | Yaeger et al. ................. | 60/527 |
| 4,684,913 A | 8/1987 | Yaeger ......................... | 337/140 |
| 5,023,737 A | 6/1991 | Yaeger ......................... | 360/105 |
| 5,060,099 A | 10/1991 | Yaeger et al. ................ | 360/105 |
| 5,184,263 A | 2/1993 | Fukakusa et al. ............ | 360/103 |
| 5,303,105 A | 4/1994 | Jorgenson .................... | 360/106 |
| 5,335,994 A | 8/1994 | Weynant nee Girones .. | 374/205 |
| 5,359,590 A | 10/1994 | Ogura et al. ................. | 369/263 |
| 5,390,059 A | 2/1995 | Tokuyama et al. .......... | 360/104 |
| 5,463,514 A | 10/1995 | Yaeger ......................... | 360/105 |
| 6,229,677 B1 | 5/2001 | Hudson et al. ........... | 360/266.1 |
| 6,307,719 B1 * | 10/2001 | Mallary .................... | 360/294.7 |
| 6,624,982 B2 * | 9/2003 | Masuda et al. ........... | 360/294.4 |

OTHER PUBLICATIONS

"Made to Measure: New Materials for the 21$^{st}$ Century", by P. Ball, pp. 124–130, 1997.

* cited by examiner

Primary Examiner—Andrew L. Sniezek
(74) Attorney, Agent, or Firm—Westman, Champlin & Kelly

(57) ABSTRACT

A disc drive includes a disc, a beam extending from the voice coil motor to a gimbal point to provide a load force, and a slider that flies over the disc with a pole tip protrusion that has an ambient temperature sensitivity. The disc drive also includes a strut with a yielding bend section (YBS). Deposits of shape memory alloys (SMA) having different first and second transformation temperature ranges are deposited on the yielding bend section (YBS) and effectively reduce an ambient temperature sensitivity of the pole tip protrusion.

28 Claims, 9 Drawing Sheets

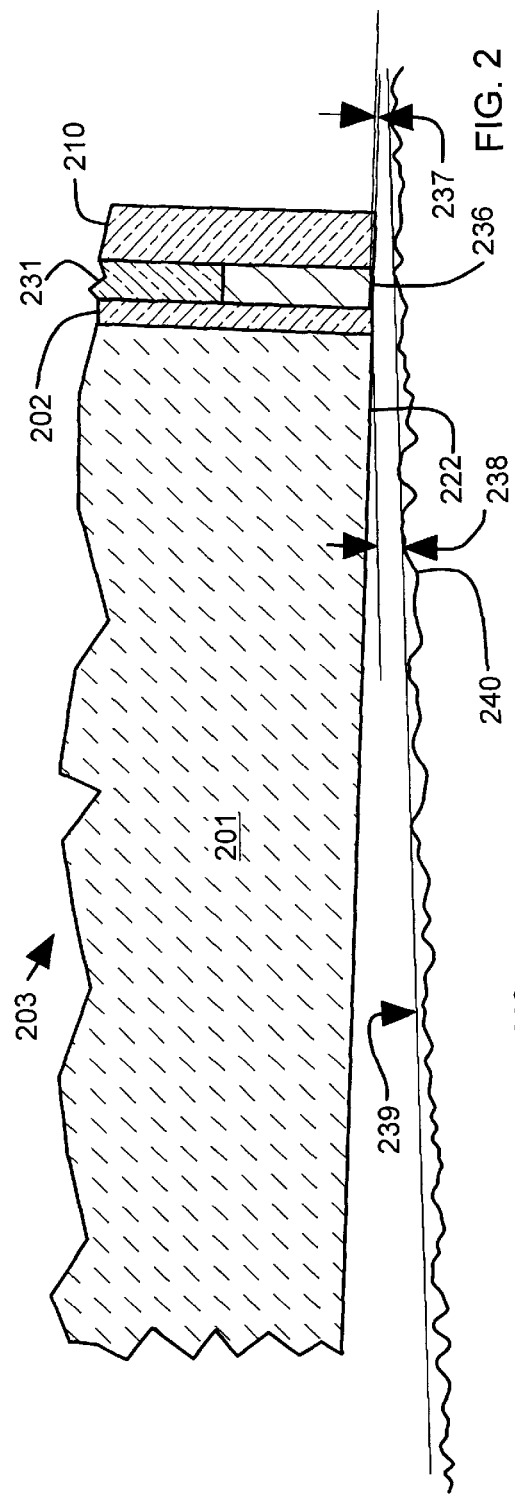
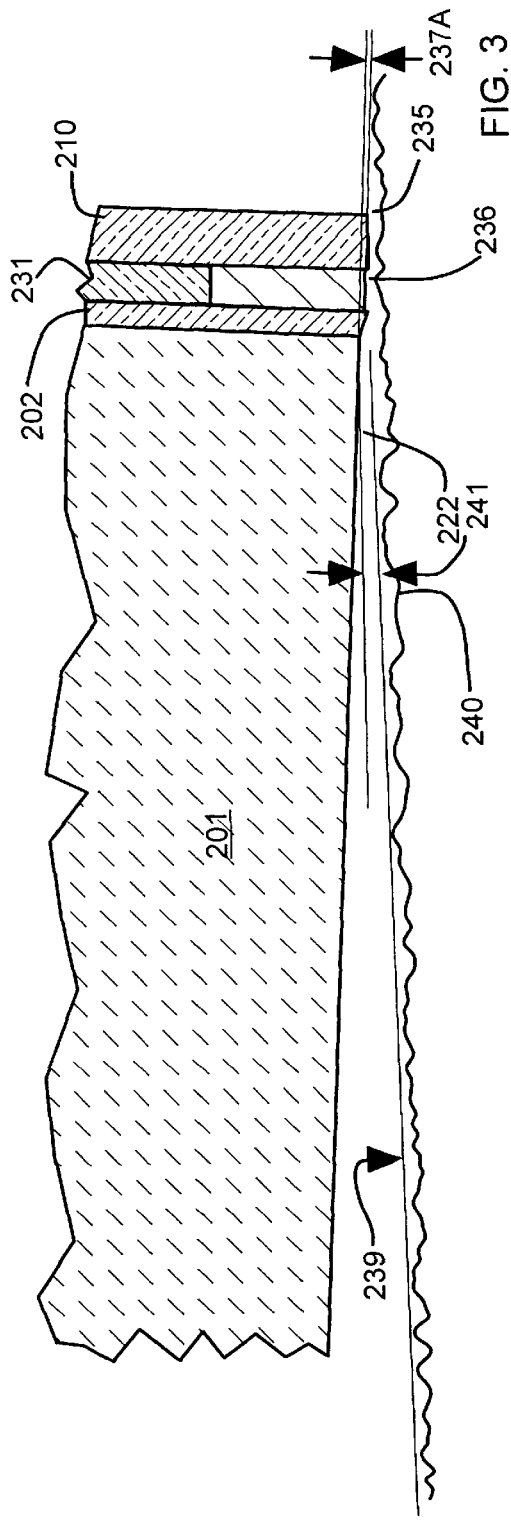

TEMPERATURE COMPENSATED FLY HEIGHT CONTROL

CROSS-REFERENCE TO RELATED APPLICATIONS

This application claims priority benefits from U.S. Provisional Application No. 60/273,045 titled "Passive Adaptive FH control for TPTR Compensation," filed Mar. 2, 2001 and identified as and also claims priority benefit from U.S. Provisional Application No. 60/269,924 titled "Apparatus and Methods for Passive Adaptive Flying Height Control in a Disc Drive, filed Feb. 19, 2001.

FIELD OF THE INVENTION

The present invention relates generally to disc drive data storage devices, and more particularly without limitation to temperature compensation for thermal pole tip protrusion between a slider and a disc.

BACKGROUND OF THE INVENTION

After a disc drive is energized, it warms up and has a temperature rise. In particular, there are large temperature rises in the heads used in a disc drive. The heads include magnetic transducers deposited on slider substrates. The magnetic transducers carry read/write currents that generate heat in the heads. The temperature rise in the heads is large because the heads have a small surface area in relation to the amount of heat that is dissipated in the magnetic transducers.

The magnetic transducers have a higher coefficient of thermal expansion (CTE) than the slider substrates. As temperature increases, the magnetic transducers thermally expand at a greater rate than the slider substrates. The thermal expansion causes the pole/shield tips of the magnetic transducers to protrude with respect to an air bearing surface of the slider substrate. At higher temperatures, the pole/shield tips protrude and are closer to the media and the transducer-media spacing (pole tip to disc spacing) is reduced. If the transducer-media spacing at lower temperature is not large enough, the protruded pole/shield tips hit the media at higher temperature.

To avoid transducer-media contact at higher temperatures, the fly height at lower temperatures is kept relatively large. This large fly height at lower temperatures, however, undesirably limits the electrical performance of transducers, particularly the areal bit density (gigabits per square inch) that can be achieved.

A method and apparatus are needed that correct for the thermal pole tip protrusion at higher temperatures.

SUMMARY OF THE INVENTION

Disclosed are embodiments of a disc drive that include a disc, a voice coil motor and a beam extending from the voice coil motor to a gimbal point. A slider in the disc drive receives a load force from the gimbal point and flies over the disc at a fly height (FH). The slider has a pole tip protrusion that is temperature sensitive. A strut in the disc drive couples between the beam and the slider. The strut includes a yielding bend section (YBS).

First and second deposits of shape memory alloys (SMA) are deposited on the yielding bend section (YBS). The first and second deposits have corresponding first and second transformation temperature ranges that differ from one another. The first and second deposits of shape memory alloy change shape in their corresponding transformation temperature ranges. The first and second deposits of shape memory alloy provide temperature compensation to the fly height between a leading edge of the slider and the disc. By compensating the fly height between the leading edge of the slider and the disc, the ambient temperature sensitivity of the pole tip to disc spacing is reduced.

These and various other features as well as advantages which characterize embodiments of the present invention will be apparent upon reading of the following detailed description and review of the associated drawings.

BRIEF DESCRIPTION OF THE DRAWINGS

FIG. 2 schematically illustrates a cross-section of a slider at room temperature flying over a disc surface.

FIG. 3 schematically illustrates a cross-section of a slider at elevated temperatures with pole tip protrusion flying over a disc surface.

DETAILED DESCRIPTION OF ILLUSTRATIVE EMBODIMENTS

In the embodiments illustrated below, a disc drive includes a slider that has a pole tip that protrudes undesirably when ambient temperature increases. The disc drive includes a strut with multiple shape memory alloy (SMA) deposits on a yielding bend section (YBS) of the strut. The multiple deposits have different transformation temperature ranges and respond to ambient temperature changes to correct the fly height between the leading edge of the slider and the disc to compensate for the temperature sensitivity of the pole tip protrusion. Electrical actuation of the shape memory alloy deposits is not required. The shape memory alloy deposits can correct for thermal pole tip protrusion at higher temperatures.

The need for increased bit density on hard drives leads to a need for decreased fly height. Factors like disc roughness, lubrication, carbon thickness, thermal pole tip recession (TPTR), and manufacturing tolerances of parts affect the budget for fly height. As fly height decreases, the percentage contribution from these factors increases. Some factors like disc roughness and material thickness can be scaled down as the fly height reduces, but other factors like TPTR and reduced lift due to lower air pressure at high altitudes can not be practically scaled down as fly height decreases.

Active temperature compensation of fly height has been proposed, however, active compensation increases electrical needs, and sometimes requires voltages as high as 40 volts and power as high as 500 milliwatts applied to an active actuator. The fly height is difficult to measure, making feedback and control difficult and expensive. The problems are particularly pronounced with the use of silicon as a slider material. Compensation of fly height is needed at a fairly high level, around 5 nanoinches/degree Centigrade. Active (electrical) feedback control of fly height requires electrical connections to the head-gimbal assembly and thus adds an additional level of complexity to testing flyability of heads during manufacture.

Figure 1:
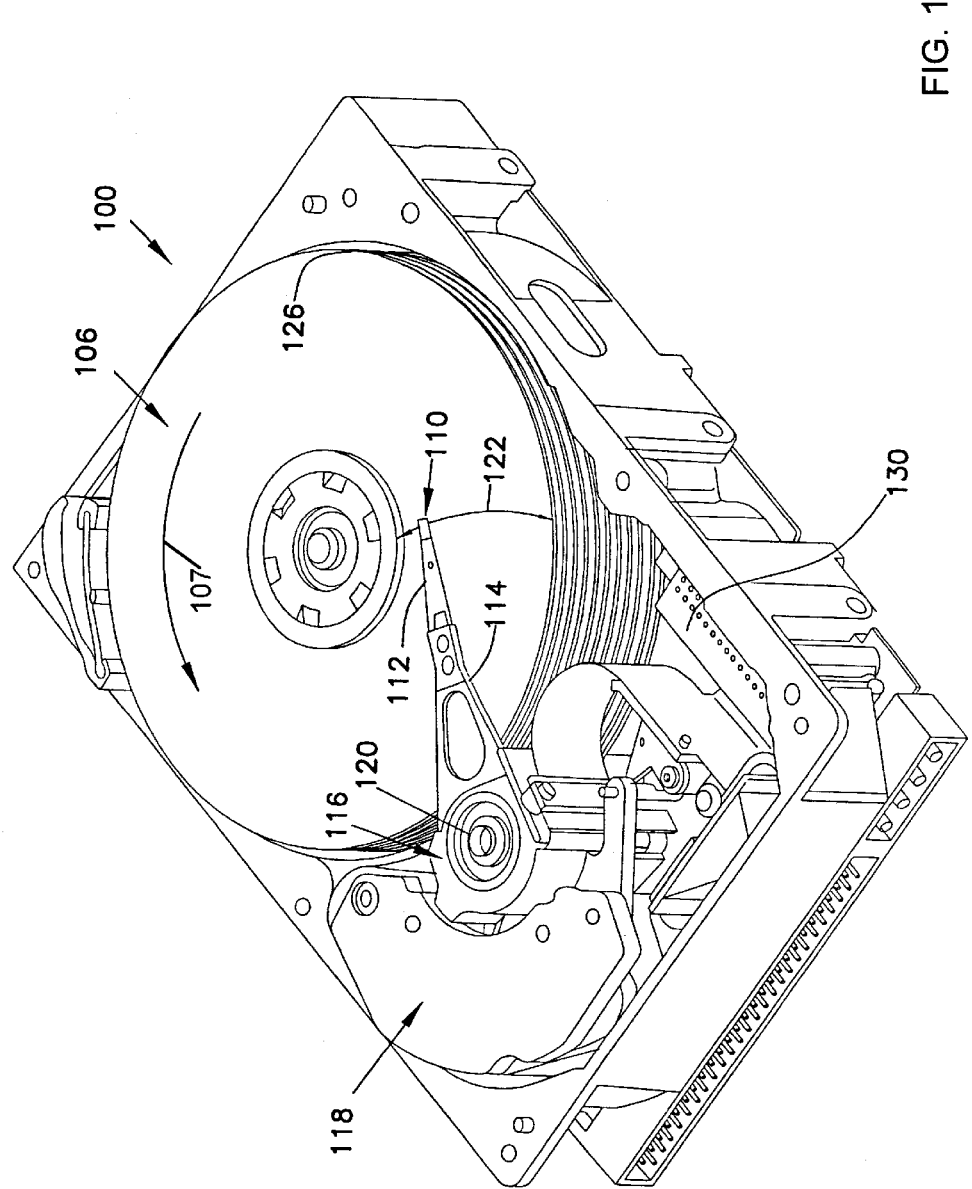
FIG. 1 illustrates a top isometric view of a disc drive.

FIG. 1 illustrates an embodiment of a disc drive 100 including a slider 110 that includes one or more read/write heads. Disc drive 100 includes a disc pack 126 having storage media surfaces 106 that are typically layers of magnetic material. The disc pack 126 includes a stack of multiple discs. A head gimbal assembly 112 includes the slider 110 with a read/write transducer for each stacked disc. Disc pack 126 is spun or rotated as shown by arrow 107 to allow head gimbal assembly 112 to access different rotational locations for data on the storage surfaces 106 on the disc pack 126.

The head gimbal assembly 112 is actuated to move radially, relative to the disc pack 126, as shown by arrow 122 to access different radial locations for data on the storage surfaces 106 of disc pack 126. Typically, the actuation of the head gimbal assembly 112 is provided by a voice coil motor 118. Voice coil motor 118 includes a rotor 116 that pivots on axle 120 and an arm 114 that actuates the head gimbal assembly 112. The arm 114 presses down on a central gimbal point on the slider 110, providing a load force that holds the slider 110 in close proximity to the storage surface 106. One or more read/write heads are deposited on the slider 110 and fly above the storage surface 106 at a fly height. A circuit at location 130 controls the radial position of the slider 110 and electrically interfaces read/write heads on sliders 110 with a computing environment.

FIGS. 2–3 schematically illustrate a broken away cross-section of a slider 203 flying over a disc media surface 240 at room temperature (FIG. 2) and at an elevated temperature (FIG. 3). During disk drive operation, electrical power is dissipated in the disc drive, particularly in the transducer 236. The ambient temperature of the air surrounding the slider 203 increases and the temperature of the slider 203 also increases. The temperature of the slider 203 itself and/or of the transducer 236 can be significantly higher than the ambient temperature due to the large amount of heat dissipated in the transducer 236 relative to the small size of the slider 203.

The coefficients of temperature expansion (CTEs) of a substrate 201 and of various deposited layers 202, 236, 210, 231 are typically different from one another. Typically, the magnetic metallic layers 236 in slider 203 have larger CTEs, and insulating layers 202, 231, 210 have lower CTEs. All these layers are grown on substrate 201 that has much larger volume compared to the volume of the layers 231, 210, 202 and the magnetic metallic layers 236. Due to the different CTEs of materials in various head layers, the shape of the slider 203 distorts at elevated temperature. The pole tip recession (PTR) 237 (FIG. 2) that is present at room temperature is reduced or completely lost with elevated head temperature as illustrated by pole tip protrusion 237A at FIG. 3. The change of PTR with temperature is therefore referred to as thermal PTR (T-PTR).

The CTEs of the aluminum oxide layers 202, 231, 210 are close to that of substrate 201, so that the pole/shield protrusion at higher operating temperatures is due primarily to expansion of the metallic layers in transducer 236. This expansion is only weakly constrained by the adjacent substrate 201, basecoat layer 202, and overcoat layers 231, 210.

During drive operation, the slider 203 flies above the spinning magnetic recording media surface 240. Over all operating temperatures of the drive, the fly height (238 in FIG. 2 and the fly height 241 in FIG. 3) needs to be kept low enough as required for reading and writing the desired high areal bit density. The slider 203 should not get in contact with magnetic media surface 240 as illustrated in FIG. 3.

The spacing between the pole tip and the disc is affected by the temperature of the slider substrate 201. It is also affected by a load force applied by an arm 114 (FIG. 1).

The performance of the transducer 236 depends primarily on the distance between the recording media and the pole/shield tips of the head 236. There is thus a need to reduce fly height to improve head performance, and a conflicting need to increase fly height to avoid head crashes due to head protrusion at high temperatures as illustrated in FIG. 3. These two conflicting needs are met in a much improved way by the arrangements described below in connection with FIGS. 4–15.

FIG. 2 shows schematically a transducer 236 at room operating temperature flying above a magnetic media surface 240 illustrated with exaggerated roughness. In FIG. 2, the transducer 236 does not contact the highest points 239 of the magnetic media surface 240. FIG. 3 shows schematically the same transducer 236 at high operating temperature. Most of the volume of the transducer 236 is formed by metallic layers and the coil insulator that have large CTEs. Due to the larger CTE of metallic layers in the transducer and possibly also of cured photoresist used as coil insulator, the pole/shield tips of transducer 236 protrude more with respect to the air bearing surface 222 at higher temperature (FIG. 3) than at room temperature (FIG. 2). This effect known as T-PTR places the transducer 236 closer to the magnetic media surface 240 at higher temperatures.

The magnetic transducer 236 has to fly low, close enough to the media, to have good electrical performance. At the same time, the slider 203 has to stay flying under all conditions without mechanically touching the media. If the fly height at lower head temperature (see FIG. 2) is not large enough, the protruded pole/shield tips 235 at higher head temperature (see FIG. 3) hit the media causing thermal asperities. This results in magnetic instabilities and contamination leading to tribological problems, and eventually a head crash. To avoid head-media contact at higher head temperature (FIG. 3), the fly height has to be large enough at lower head temperature (FIG. 2), with undesirable effect on head electrical performance.

It is difficult to keep the fly height low enough over the operating temperature range without having head-media contact. These difficulties are solved in a much improved way by the arrangements described below in connection with FIGS. 4–15.

FIGS. 4–8 illustrate various portions of a read/write head assembly (such as head gimbal assembly 112 in FIG. 1) that includes a strut yielding bend section with multiple deposits of shape memory alloy. The arrangement with shape memory alloy deposits effectively compensates for thermal pole tip protrusion.

Shape memory alloys (SMAs) are materials that are deformed at a low temperature and then change back to their original undeformed condition at a higher temperature. This change of shape is believed to result from a transformation from a martensite crystal structure to a Austenite crystal structure in a relatively narrow transformation temperature range. Shape metal alloys typically exhibit some hysteresis as they pass through the transformation temperature range. Shape memory alloys are typically formed from a nickel-titanium alloy (nitinol) or a copper-zinc alloy. Trace amount of aluminum, tin and gallium can also be added. Shape memory alloys include both one-way SMAs and two-way SMAs.

One-way SMAs change shape as they are heated without the application of an external force. When one-way SMAs are cooled, however, an external force (typically provided by a spring) is needed to reverse the shape change.

Two-way SMAs change shape as they are heated without the application of an external force. Two-way SMAs also change shape as they are cooled without the application of an external force. Two-way SMAs are also referred to as reversible SMAs.

In the present application, the use of one-way, two-way SMAs, or both one-way and two-way SMAs in a disc drive is contemplated.

Figure 4:
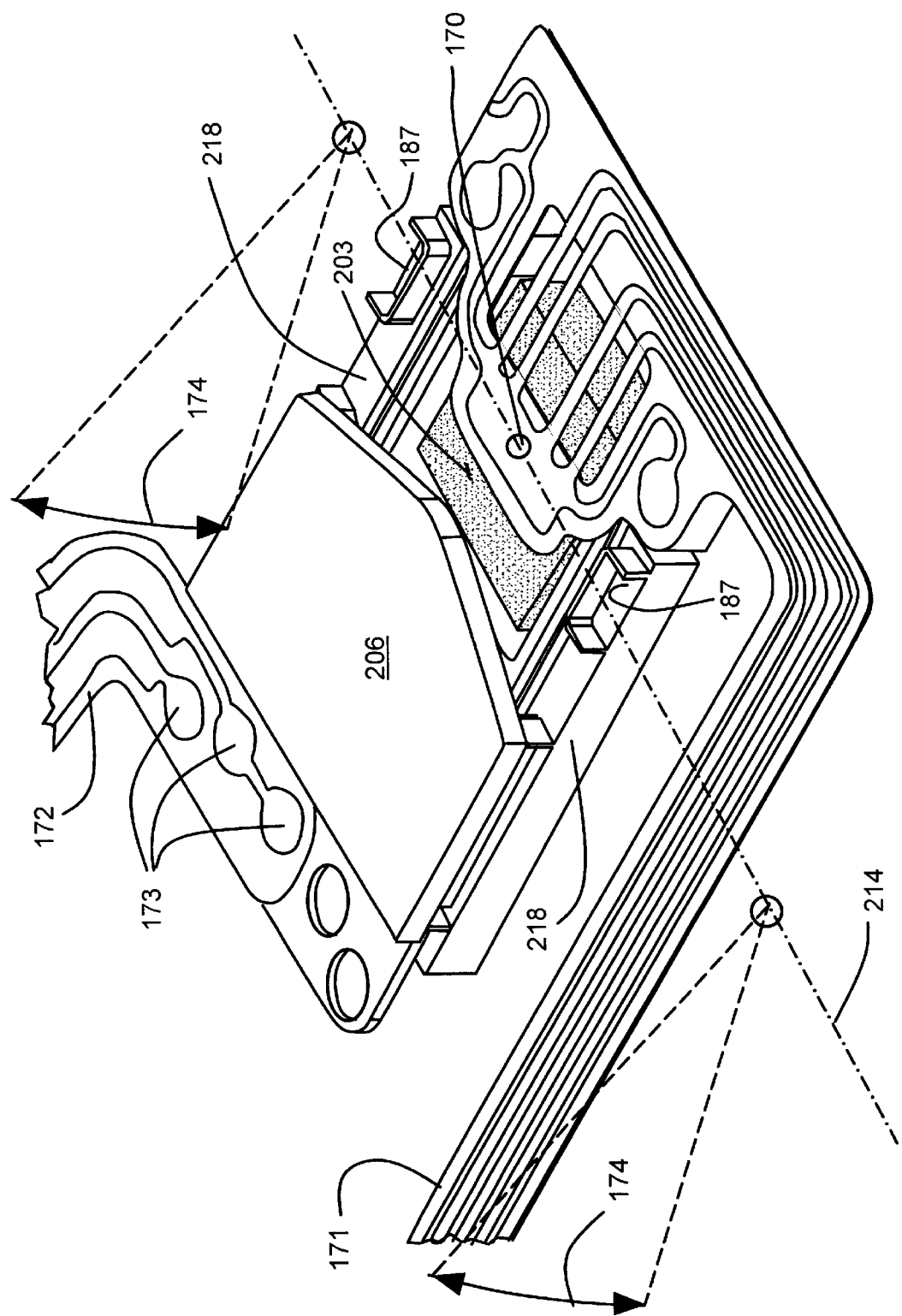
FIG. 4 illustrates a head-microactuator assembly.

In FIG. 4, a slider 203 with a read/write head is shown that slides over an air bearing on a disc surface as explained above in connection with FIG. 1. A load beam 140 (illustrated in FIG. 5) provides a load force (preload) at gimbal point 170 on the slider 203. The load force is generally perpendicular to the disc surface and presses the slider 203 toward the disc surface. A pitch axis 214 that is generally perpendicular to the direction of disc movement under the slider 203 passes through gimbal point 170. The load force holds the slider 203 in close proximity to the disc. The slider 203 is mounted to a microactuator 206, and the microactuator 206 is mounted by way of bonding regions 187 on microactuator mounting arms 218 to a flexible strut 180 (illustrated in FIG. 6). The slider 203 flies over the disc at a pitch static angle 174 relative to the disc surface.

The microactuator 206 has microactuator electrical contacts 173 that connect to a first flex circuit 172. A second flex circuit 171 connects to the slider 203 and provides electrical connections for a read/write transducer on the slider 203.

Figure 5:
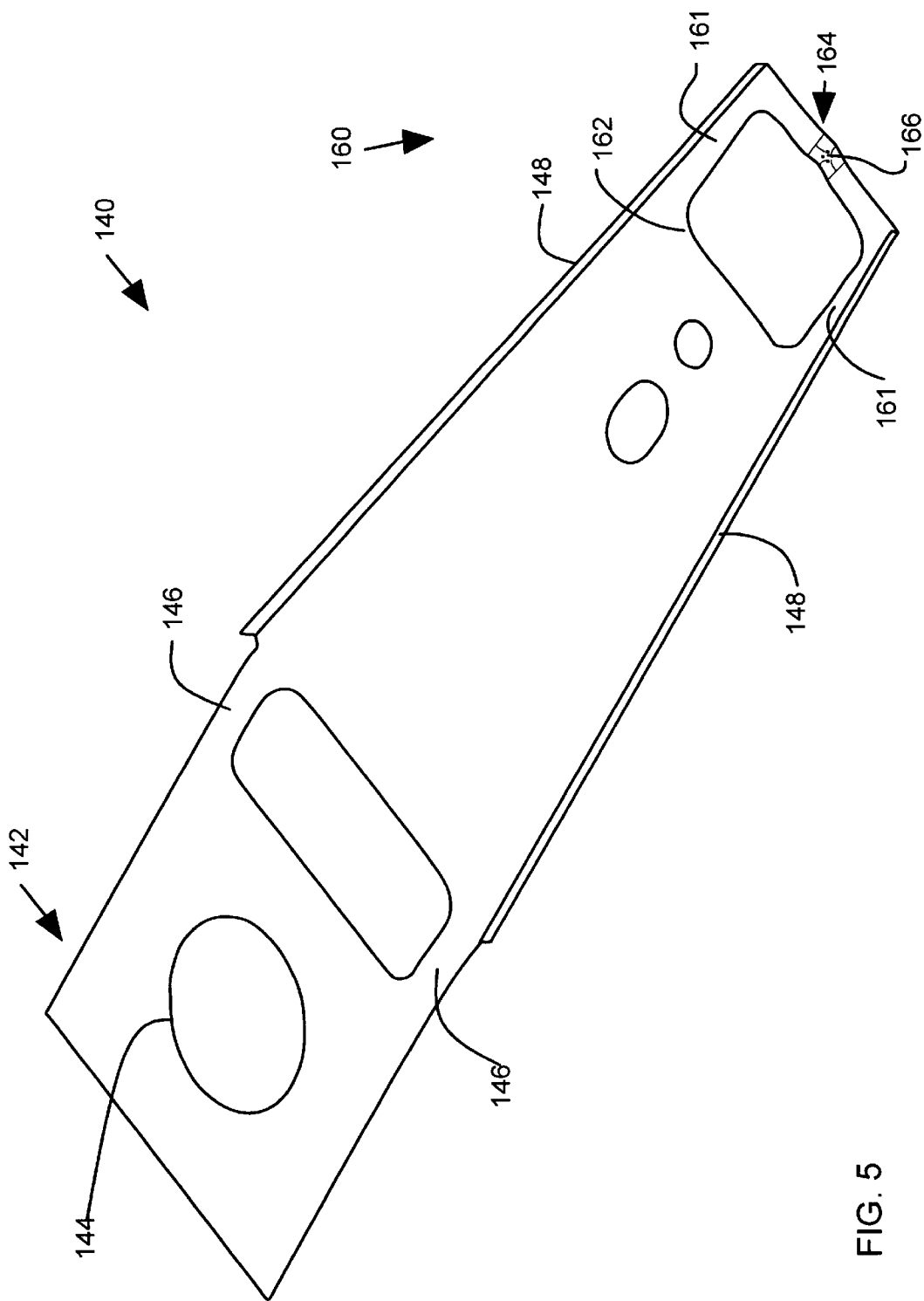
FIG. 5 illustrates a top isometric view of a load beam.

FIG. 5 illustrates a top isometric view of the beam 140. Beam 140 functions as a load beam that applies a mechanical load to the slider 203 illustrated in FIG. 4. The beam 140 is preferably formed of stainless steel and extends from a first end 142 that includes a mounting hole 144 to a second end 160 that includes a window frame 162 and a preload dimple 166 in a gimbal region 164. The beam 140 includes preload spring regions 146, which generate the preload force that is applied at the preload dimple 166. The main body of the beam 140 includes side rails 148 that extend alongside the window frame 162. Flat sections 161 on the sides of the window frame 162 join with the side rail 148. The load force from preload spring regions 146 is transferred through the forming margins (straight sections 161 and adjacent portions of rails 148).

Figure 6:
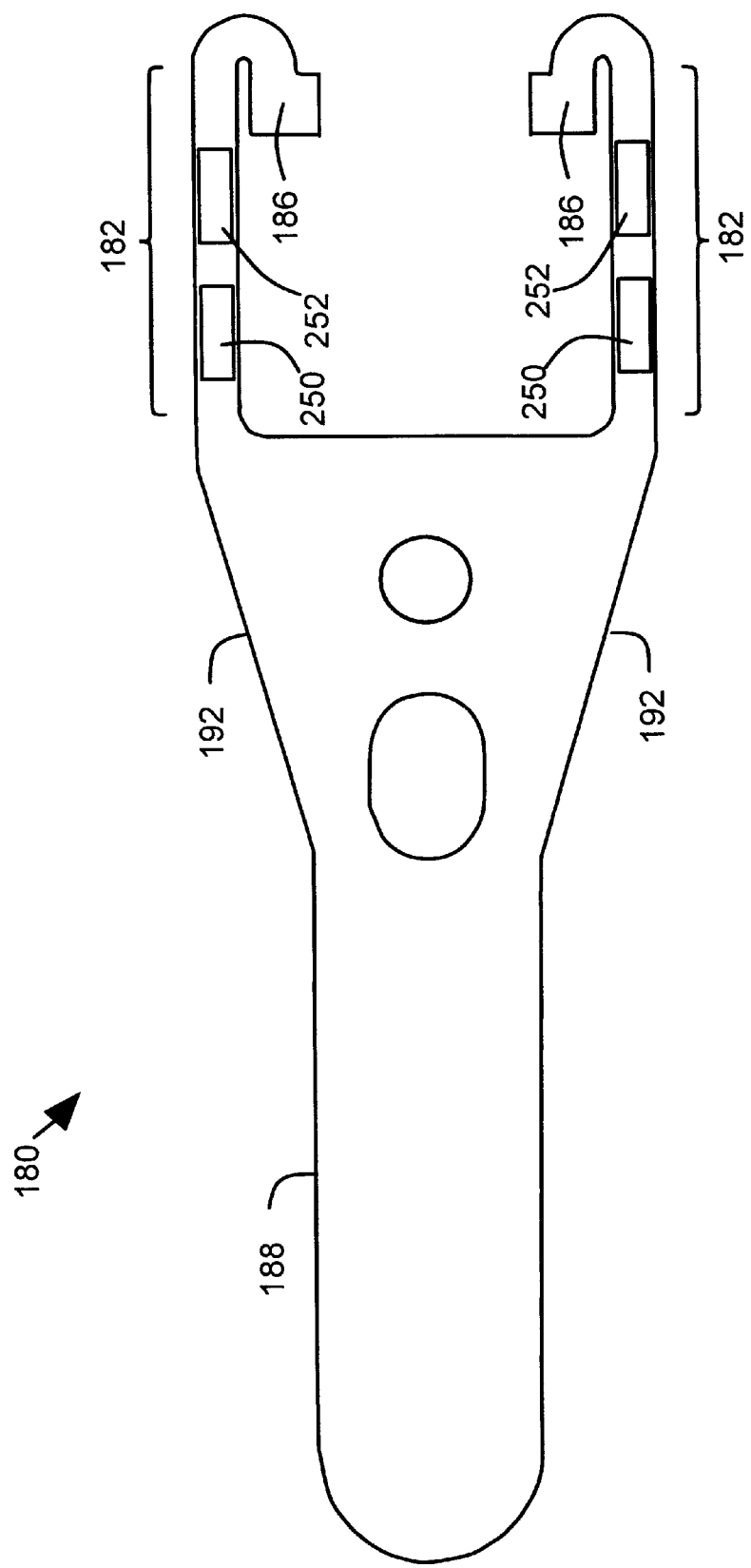
FIG. 6 illustrates a bottom view of a gimbal strut including multiple deposits of shape memory alloy.

FIG. 6 illustrates a bottom view of the gimbal strut 180. Gimbal strut 180 is typically formed of stainless steel. Gimbal strut 180 has a main body 188 that extends to a tapered portion 192 which supports a pair of yielding bend sections 182. Ends 186 include a reverse bend and are bonded to regions 187 of the microactuator 206 illustrated in FIG. 4. A first deposit 250 and a second deposit 252 of shape memory alloy are deposited on each yielding bend section 182. The gimbal strut 180 of FIG. 6 is assembled with the beam 140 of FIG. 5 as described below in connection with FIG. 7.

Figure 7:
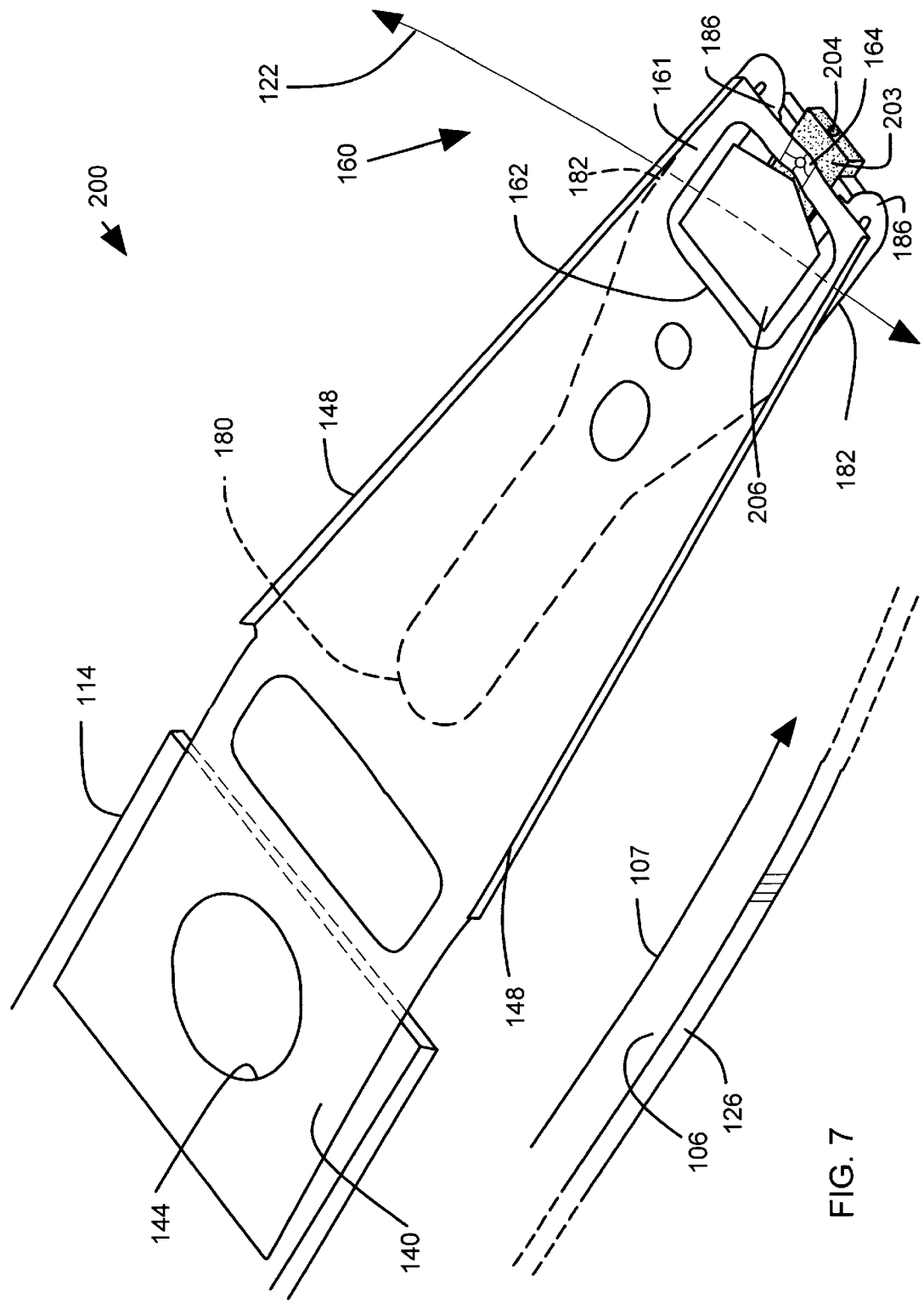
FIG. 7 illustrates a top view of an assembly of a load beam, gimbal strut, flex circuit, microactuator and head.

FIG. 7 illustrates a top view of a head gimbal assembly 200 that corresponds generally with the head gimbal assembly 112 illustrated in FIG. 1. Head gimbal assembly 200 includes the load beam 140 of FIG. 5 and the gimbal strut 180 of FIG. 6. The head gimbal assembly 200 also includes flex circuits 171, 172 (illustrated in FIG. 4) that electrically connect at contacts 173 to a microactuator 206 and a read/write head 204 on slider 203 in the head gimbal assembly 200. The microactuator 206 includes a microactuator main body that is surrounded by the window frame 162. The assembly of the head gimbal assembly 200 near the second end 160 of the load beam 140 is somewhat complex, and is enlarged and illustrated in more detail below in FIG. 8.

Figure 8:
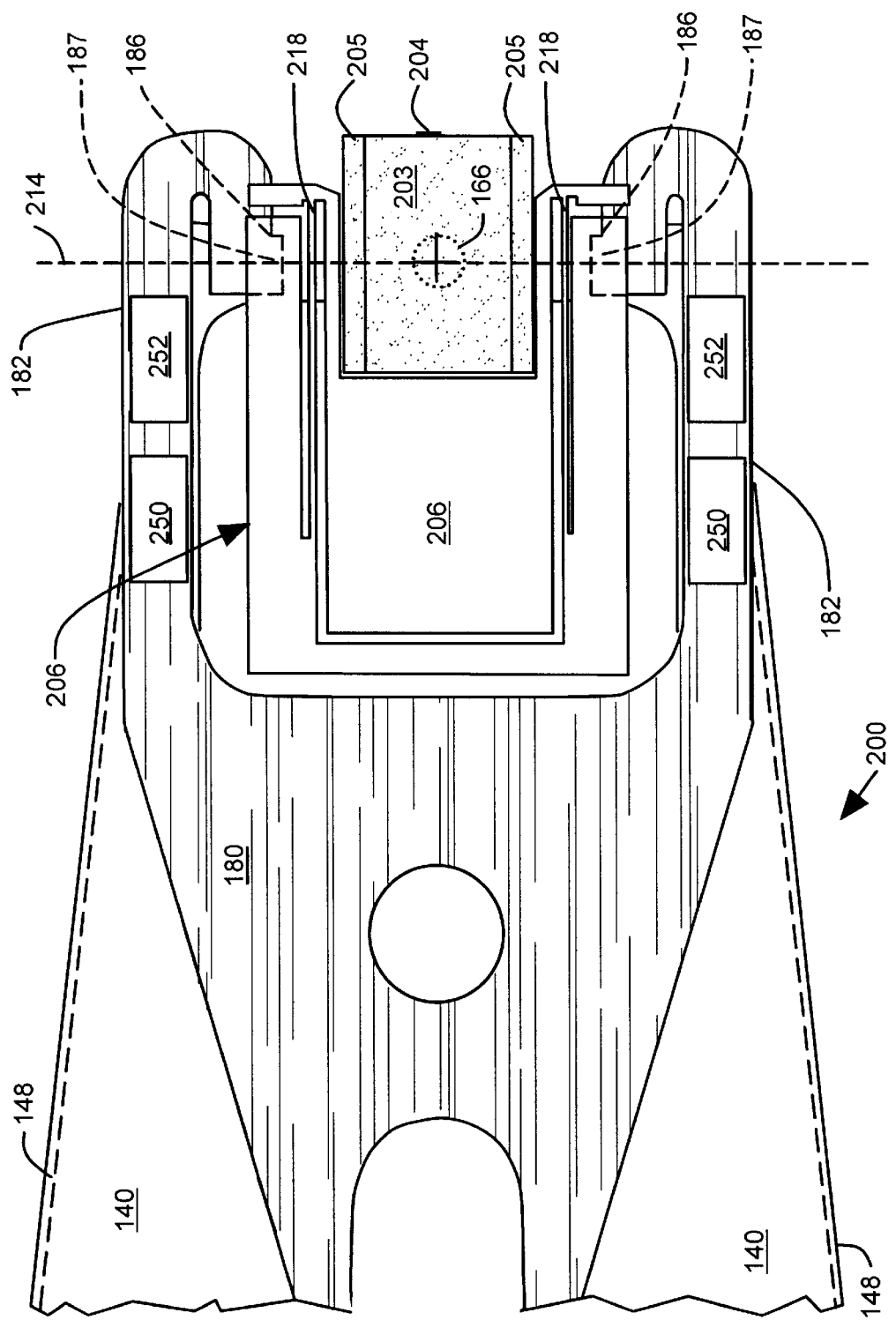
FIG. 8 illustrates a detailed bottom view of a portion of the assembly illustrated in FIG. 7.

FIG. 8 illustrates a detailed bottom view of a portion of the head gimbal assembly 200 at the second end 160 of the load beam 140. The view in FIG. 8 is taken from the side that faces disc 126 in FIG. 1. The flex circuitry 171, 172 is omitted from FIG. 8 for clarity. The microactuator 206 is bonded to the ends 186 of strut 140 at locations 187 on the microactuator 206. The microactuator 206 is also bonded to the slider 203. The microactuator 206 includes thin flex arms 218 that allow for relative motion between the slider 203 and the ends 186 when the microactuator 206 is actuated. As illustrated in FIG. 8, the slider 203 has a pitch axis 214 aligned with preload dimple 166. Slider 203 includes rails 205 that serve as sliding surfaces for the slider 203 to slide on the disc 126 when the disc 126 is stopped or started.

The disc drive illustrated in FIGS. 7–8 includes a disc 126, a voice coil motor 114 and a beam 140 extending from the voice coil motor 114 to a gimbal point 164. The gimbal point 164 provides a load force to a slider 203 that flies over a media surface 106 on the disc 126 at a fly height (FH). The slider 203 has pole tip protrusion that has an ambient temperature sensitivity as explained above in connection with FIGS. 2–3.

The strut 180 mechanically couples between the beam 140 and the slider 203. The strut includes two yielding bend sections (YBS) 182. A first deposit 250 of shape memory alloy (SMA) with a first transformation temperature range is deposited on each yielding bend section 182. A second deposit 252 of shape memory alloy (SMA) with a second transformation temperature range is also deposited on each yielding bend section 182. The second transformation temperature range is different from the first transformation temperature range. The first and second deposits 250, 252 undergo shape transformations in different temperature ranges. The changes in shape of first deposits 250 take place at a different ambient temperature that the changes of shape of the second deposits 252. The changes in shape affect the spring characteristics of the yielding bend sections 182 at different ambient temperatures. Changing the spring characteristics of the yielding bend sections 182 changes the pitch static attitude (PSA) angle 174 (see FIG. 4) of the slider relative to the disc surface, which affects fly height. The deposits 250, 252 are arranged so that the spring characteristics are changed in a direction that tends to effectively compensate for ambient temperature sensitivity of the pole tip protrusion as explained above in connection with FIGS. 2–3.

The deposits 250, 252 can be one-way or two-way SMAs. If a oneway SME is used, the yielding bend section provides the needed spring force during cooling to reverse the shape change. If a two-way SME is used, then the SME can reverse the shape change during cooling with or without a spring force from the yielding bend section 182.

In one preferred arrangement, deposits of shape memory alloy are selected to have shape transformation temperature ranges that are spaced in close increments, e.g., 40° C., 50° C., 60° C., 65° C. to closely match the continuous changes in thermal pole tip recession. The length of each deposit of shape metal alloy can be selected to provide the desired amplitude of compensation. While only two deposits 250, 152 are illustrated in FIGS. 7–8, larger numbers of deposits can be used to provide more increments of adjustment over an operating temperature range of the disc drive.

The deposits 250, 252 can be attached to the yielding bend sections 182 with laser spot welds, adhesive, low temperature solder or other known attachment methods.

While the individual deposits 250, 252 provide shape changes that are relatively abrupt as a function of temperature, the use of multiple deposits provides smaller shape changes that are spaced apart in temperature. This arrangement with multiple deposits tends to provide a quasi-continuous incremental temperature compensation.

The shape memory alloy deposits 250, 252 are exposed to the surrounding ambient temperature and are actuated by changes in the ambient temperature, and may also be actuated by a spring force in the yielding bend section 182. Shape memory alloy deposits 250, 252 do not require any electrical connections or electrical heating for operation. Shape memory alloy deposits 250, 252 are passive elements in the sense that deposits 250, 252 do not require any electrical energization. Only the naturally occurring ambient temperature changes (and, in some cases spring forces) in the disc drive are needed for actuation of the deposits 250, 252.

The slider 203 includes a read/write head 204 having thermal pole tip protrusion (TPTP) that increases as the ambient temperature increases. The first and second deposits 250, 252 provide multiple incremental adjustments of pitch static attitude (PSA) 174 that incrementally increase the fly height (FH) as the ambient temperature increases to effectively correct for thermal changes in pole tip protrusion. The arrangement of the first and second deposits 250, 252 on the yielding bend sections 182 is explained in more detail below in connections with FIGS. 9–14.

FIGS. 9–14 illustrate various alternative arrangements of yielding bend sections and deposits of shape memory alloy.

Figure 9:
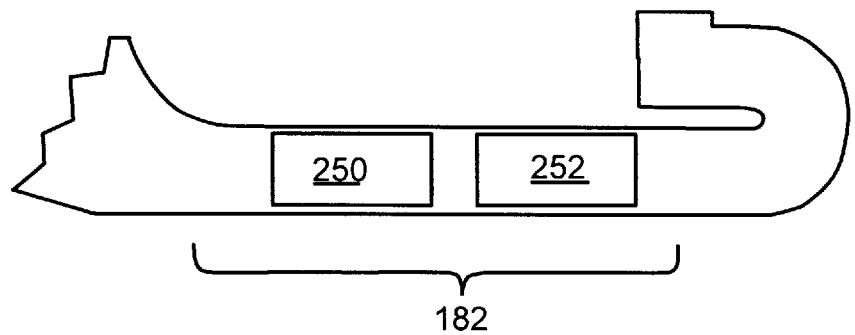
FIGS. 9–14 illustrate various alternative arrangements of yielding bend sections and deposits of shape memory alloy.
Figure 10:
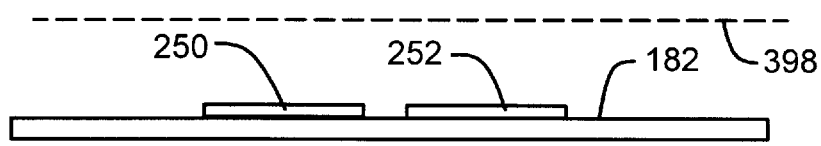

FIGS. 9–10 illustrate an arrangement of a yielding bend section 182 (as shown in FIG. 8) with first and second deposits 250, 252 of shape memory alloy on a side of the yielding bend section 182 that faces a disc 398. The arrangements in FIGS. 9–10 provides incremental bends for temperature compensation.

Figure 11:
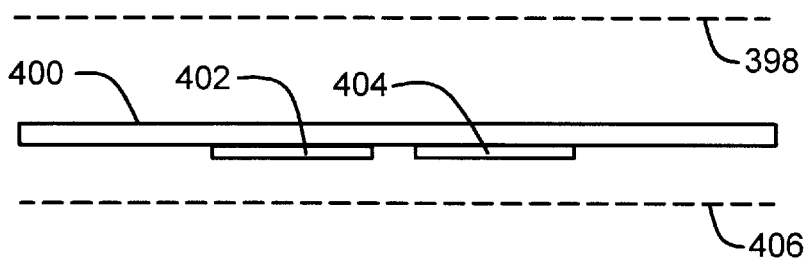

FIG. 11, however, illustrates an arrangement of a yielding bend section 400 with first and second deposits 402, 404 of shape memory alloy on a side of the yielding bend section 400 that is away from the disc 398. Deposits 402, 404 are on a side of the yielding bend section that faces a load beam 406 (comparable to load beam 140). The arrangement in FIG. 11 provides incremental bends for temperature compensation. The arrangement in FIG. 11 can provide incremental bends for temperature compensation in a direction opposite that of the arrangement shown in FIGS. 9–10, or allow depositing the deposits 402, 404 in a reverse direction relative to FIGS. 9–11, depending on the needs of the application.

Figure 12:
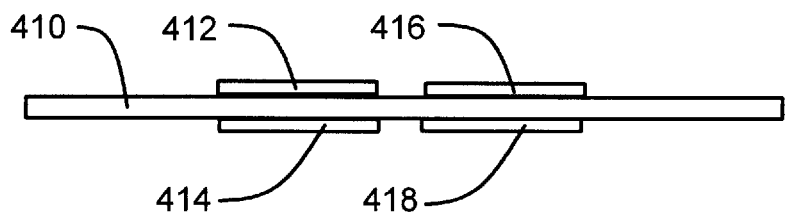

FIG. 12 illustrates an arrangement of a yielding bend section 410 that has two first deposits 412, 414, with a first transformation temperature range, on both sides of yielding bend section 410. The yielding bend section 410 also has two second deposits 416, 418, with a second transformation temperature range on both sides of the yielding bend section 410.

The deposits 412, 414 can be arranged to bend in the same direction to provide an incremental adjustment that is an incremental bend that provides temperature compensation. Likewise, the deposits 416, 418 can be arranged to bend in the same direction to provide an incremental adjustment that is an incremental bend that provides temperature compensation.

Alternatively, The deposits 412, 414 can be arranged to bend opposite directions to provide an incremental adjustment that is an incremental stiffening of the yielding bend section 410 that provides temperature compensation. The deposits 416, 418 can also be arranged to bend in opposite directions to provide an incremental adjustment that is an incremental stiffening of the yielding bend section that provides temperature compensation.

Figure 13:
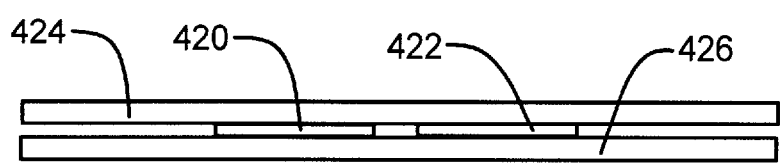

FIG. 13 illustrates an arrangement in which deposits 420, 422 of shape memory alloy are deposited within a laminated yielding bend section. The laminated yielding bend section comprises a first yielding bend section 424 and a second yielding bend section 426.

Figure 14:
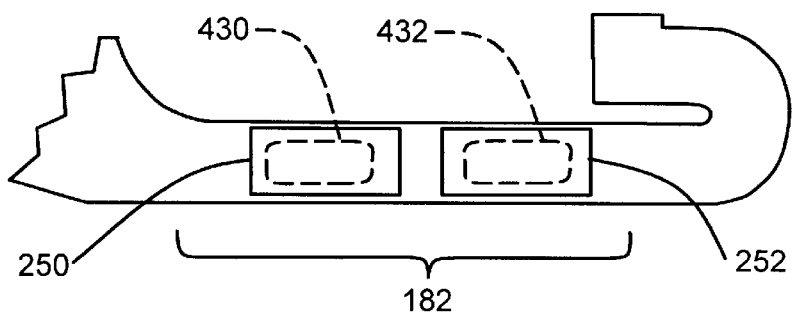

FIG. 14 illustrates an arrangement similar to that shown in FIG. 9. In FIG. 14, however, holes 430, 432 are provided in the yielding bend section 182 to permit freer movement of the shape memory alloy deposits 250, 252. The holes 430, 432 can alternatively be enlarged so that the yielding bend section 182 is broken into pieces, with the gaps bridged and joined by the deposits 250, 252.

Figure 15:
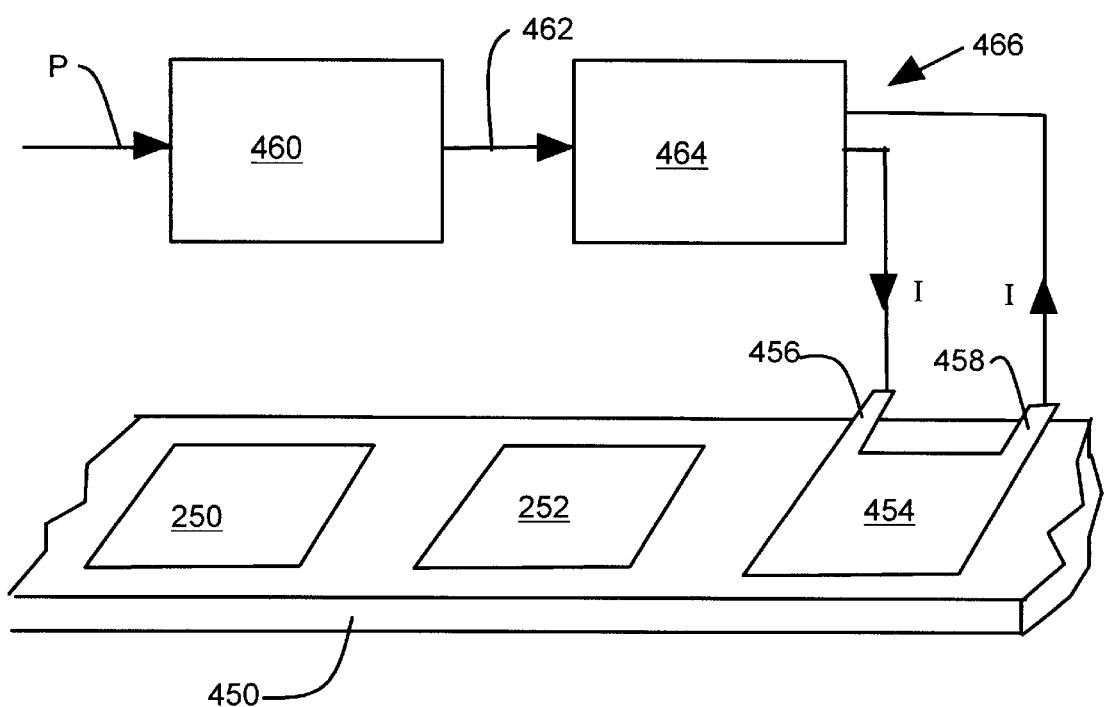
FIG. 15 illustrates an arrangement of a yielding bend section that includes ambient temperature and ambient pressure compensation.

FIG. 15 illustrates an arrangement of a yielding bend section 450 that includes ambient temperature and ambient pressure compensation. Yielding bend section 450 includes two deposits 250, 252 of shape memory alloy as explained above in connections with FIGS. 7–8. Deposits 250, 252 are passive elements that are not electrically energized. The yielding bend section 450 also includes an element 454 of shape memory alloy that has electrical contacts 456, 458. The element 454 is electrically energized by an electrical current I that passes through the element 454.

The ambient air pressure P in the disc drive is sensed by a pressure sensor 460 mounted in the disc drive. The sensor 460 provides an ambient pressure sensor output 462. A control circuit 464 receives the ambient pressure sensor output 462 and generates an electrical control output at output 466. The control circuit 464 is preferably part of a disc drive controller. The electrical control output is a current I that energizes the shape memory alloy deposit 454 at contacts 456, 458. The element 454 receives the electrical control output (current I) to compensate for changes in fly height (FH) due to ambient pressure changes. The yielding bend section 450 thus includes passive ambient temperature compensation and active ambient pressure compensation that helps to effectively compensate for thermal pole tip protrusion in a disc drive.

In summary, a disc drive (100) includes a disc (126), a voice coil motor (118, 116, 114) and a beam (140) extending from the voice coil motor (118, 116, 114) to a gimbal point (166). A slider (203) in the disc drive (100) receives a load force from the gimbal point (166) and flies over the disc (126). The slider (203) has thermal pole tip protrusion that has an ambient temperature sensitivity. A strut (180) in the disc drive (100) couples between the beam (140) and the slider (203). The strut (180) includes a yielding bend section (YBS) (182, 400, 410, 424, 450).

First deposits (250, 402, 412, 414, 420) and second deposits (252, 404, 416, 418, 422) of shape memory alloys (SMA) are deposited on the yielding bend section (YBS) (182, 400, 410, 424, 450).

The first and second deposits have corresponding first and second transformation temperature ranges that differ from one another. The first and second deposits of shape memory alloy change shape in their corresponding transformation temperature ranges. The first and second deposits of shape memory alloy provide temperature compensation. The temperature compensation changes the fly height and the problem with thermal pole tip protrusion at higher ambient temperatures is effectively reduced.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the shape of the deposits of shape memory alloy may vary depending on the particular application for the disc drive while maintaining substantially the same functionality without departing from the scope and spirit of the present invention. In addition, although the preferred embodiment described herein is directed to a head pitch adjustment for a magnetic storage system, it will be appreciated by those skilled in the art that the teachings of the present invention can be applied to other systems, like optical or magneto-optic systems, without departing from the scope and spirit of the present invention.

What is claimed is:

1. A disc drive, comprising:
    a disc;
    a voice coil motor and a beam extending from the voice coil motor to a gimbal point, the gimbal point providing a load force;
    a slider that receives the load force and that flies over the disc with a pole tip protrusion that has an ambient temperature sensitivity;
    a strut coupled between the beam and the slider, the strut including a yielding bend section (YBS); and
    first and second deposits of shape memory alloys (SMA) having corresponding first and second transformation temperature ranges that differ from one another, the first and second deposits being deposited on the yielding bend section (YBS).

2. The disc drive of claim 1 wherein the first and second deposits are at the ambient temperature.

3. The disc drive of claim 2 wherein the first and second deposits are actuated by change in the ambient temperature.

4. The disc drive of claim 1 wherein the slider includes a read/write head having increasing thermal pole tip protrusion (TPTP) that effectively decreases the fly height as the ambient temperature increases and wherein the first and second deposits provide multiple incremental adjustments of pitch static attitude (PSA) that incrementally increase the fly height (FH) as the ambient temperature increases.

5. The disc drive of claim 4 wherein the multiple incremental adjustments are incremental bends of the yielding bend section.

6. The disc drive of claim 4 wherein the multiple incremental adjustments are incremental stiffenings of the yielding bend section.

7. The disc drive of claim 1 and further comprising:
    a sensor providing an ambient pressure sensor output;
    a circuit receiving the ambient pressure sensor output and generating an electrical control output; and
    an electrical element that comprises a shape metal alloy deposit on the yielding bend section, the element receiving the electrical control output to compensate for changes in fly height (FH) due to ambient pressure changes.

8. The disc drive of claim 1 wherein the first and second deposits of shape memory alloy comprise one-way shape memory alloys.

9. The disc drive of claim 1 wherein the first and second deposits of shape memory alloy comprise two-way shape memory alloys.

10. The disc drive of claim 1 wherein the first deposit of shape memory alloy comprises one-way shape memory and the second deposit of shape memory alloy comprises two-way shape memory alloy.

11. A method of reducing ambient temperature sensitivity of a slider, comprising:
    providing a disc and a voice coil motor;
    providing a load force at a gimbal point on a beam extending from the voice coil motor;
    applying the load force to a slider that flies over the disc with a pole tip protrusion that has an ambient temperature sensitivity;
    providing a yielding bend section (YBS) in a strut coupled between the beam and the slider; and
    reducing ambient temperature sensitivity of the pole tip protrusion by depositing first and second deposits of shape memory alloys (SMA), having corresponding first and second transformation temperature ranges that differ from one another, on the yielding bend section (YBS).

12. The method of claim 11 and exposing the first and second deposits to the ambient temperature.

13. The method of claim 12 and actuating the first and second deposits by a change in the ambient temperature.

14. The method of claim 11 wherein the slider includes a read/write head having increasing thermal pole tip protrusion (TPTP) that effectively decreases the fly height as the ambient temperature increases; and
    making multiple incremental adjustments of pitch static attitude (PSA) with the first and second deposits to incrementally increase fly height as the ambient temperature increases.

15. The method of claim 14 wherein the multiple incremental adjustments are incremental bends of the yielding bend section.

16. The method of claim 14 wherein the multiple incremental adjustments are incremental stiffenings of the yielding bend section.

17. The method of claim 11 and further comprising:
    a sensor providing an ambient pressure sensor output;
    a circuit receiving the ambient pressure sensor output and generating an electrical control output; and
    an electrical element that comprises a shape metal alloy deposit on the yielding bend section, the element receiving the electrical control output to compensate for changes in fly height (FH) due to ambient pressure changes.

18. The method of claim 11 wherein the first deposit of shape memory alloy comprises one-way shape memory alloy.

19. The method of claim 11 wherein the first deposit of shape memory alloy comprises two-way shape memory alloy.

20. A disc drive, comprising:
    a disc; a voice coil motor and a beam extending from the voice coil motor to a gimbal point, the; a slider that flies over the disc with a pole tip protrusion that has an ambient temperature sensitivity; and a strut coupled between the beam and the slider, the strut including a yielding bend section (YBS); and first and second deposits of shape memory alloys (SMA) on the yielding bend section having corresponding first and second transformation temperature ranges that differ from one another to compensate for the ambient temperature sensitivity of the pole tip protrusion.

21. The disc drive of claim 20 wherein the first and second deposits are at the ambient temperature.

22. The disc drive of claim 21 wherein the first and second deposits are actuated by change in the ambient temperature.

23. The disc drive of claim 22 wherein the multiple incremental adjustments are incremental bends of the yielding bend section.

24. The disc drive of claim 22 wherein the multiple incremental adjustments are incremental stiffenings of the yielding bend section.

25. The disc drive of claim 20 and further comprising:
a sensor providing an ambient pressure sensor output;
a circuit receiving the ambient pressure sensor output and generating an electrical control output; and
an electrical element that comprises a shape metal alloy deposit on the yielding bend section, the element receiving the electrical control output to compensate for changes in fly height (FH) due to ambient pressure changes.

26. The disc drive of claim 20 wherein the first and second deposits of shape memory alloy comprise one-way shape memory alloys.

27. The disc drive of claim 20 wherein the first and second deposits of shape memory alloy comprise two-way shape memory alloys.

28. The disc drive of claim 20 wherein the first deposit of shape memory alloy comprises one-way shape memory and the second deposit of shape memory alloy comprises two-way shape memory alloy.

* * * * *